Figure 3:
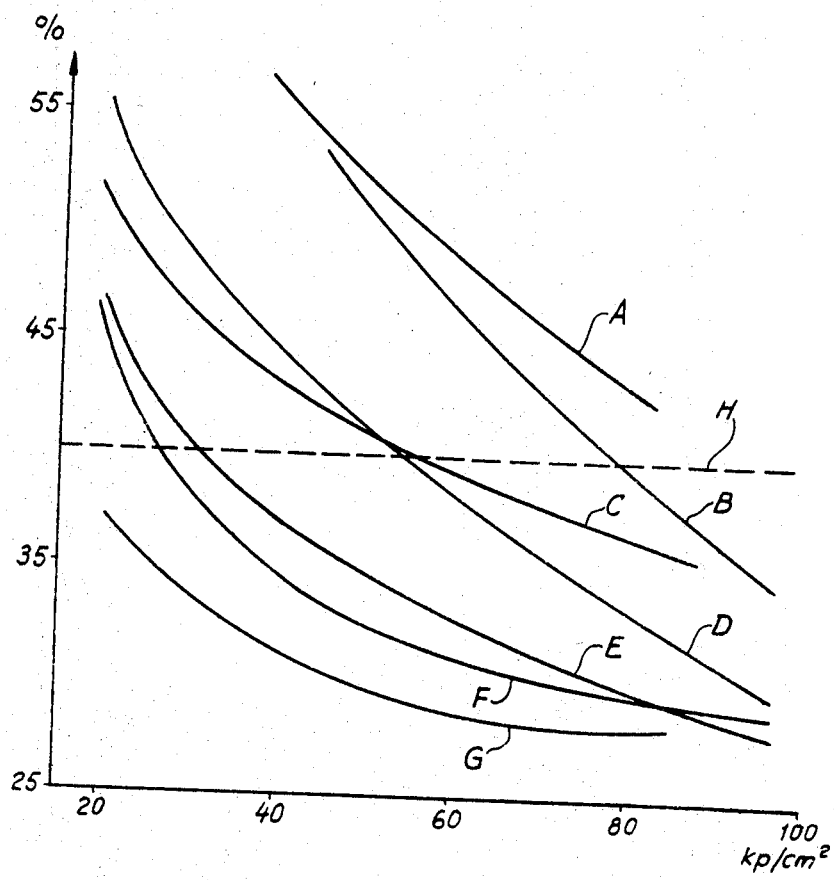

United States Patent

[11] 3,559,566

[72] Inventors John Axel Aspegren
Stockholm;
Jan Anders Askling, Tullinge; Lars-Ingvar
Larsson, Tullinge, Sweden
[21] Appl. No. 682,801
[22] Filed Nov. 14, 1967
[45] Patented Feb. 2, 1971
[73] Assignee Alfa-Laval AB
Tumba, Sweden
a corporation of Sweden
[32] Priority Nov. 18, 1966
[33] Sweden
[31] 15807/1966

[54] METHOD FOR DEHYDRATING GREEN CROP
9 Claims, 3 Drawing Figs.
[52] U.S. Cl. .................................................. 100/38,
34/39, 100/93, 100/110, 100/232
[51] Int. Cl. ...................................................... B30b 15/34

[50] Field of Search .................................... 100/35, 37,
38, 92, 93, 98, 232, 110; 34/14, 39, 15, 16

[56] References Cited
UNITED STATES PATENTS
729,149   5/1903   Fenn ............................ (Pell./Digest)
2,393,130 1/1946   Toulmin, Jr. ................. (Pell./Digest)
3,352,229 11/1967  Morse .......................... 100/38

Primary Examiner—Peter Feldman
Attorney—Davis, Hoxie, Faithfull & Hapgood

ABSTRACT: The green crop is compressed and, during the compressing operation, is heated to a temperature of at least about the boiling point of water at the prevailing gas pressure; and the moisture emitted from the crop as a result is allowed to escape. Preferably, the green crop is held compressed during part of the time when steam is leaving it due to the heating, whereby a self-sustained or coherent end product is obtained.

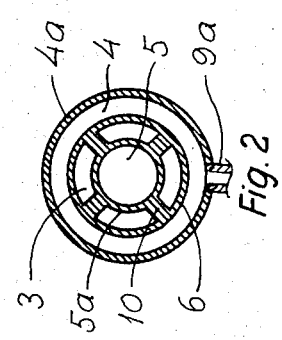
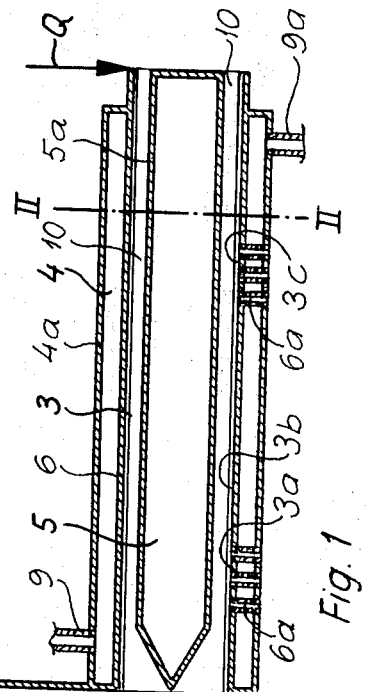
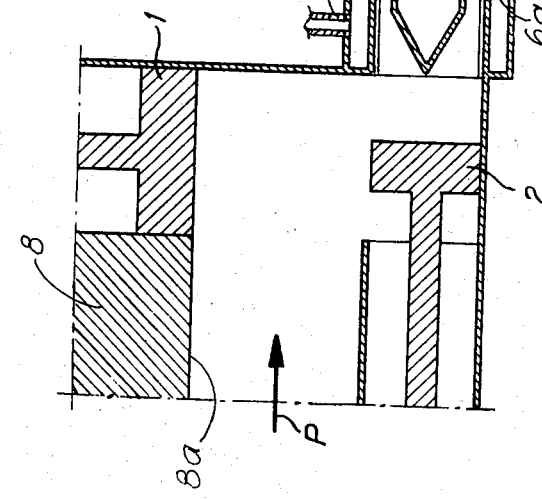

3,559,566

METHOD FOR DEHYDRATING GREEN CROP

THE DISCLOSURE

The present invention relates to a method of dehydrating green crop in an artificial way. The need for artificial or forced dehydration of green crop has arisen mainly because the green crop, if left on the field for too long a time in bad weather, can partly lose its nutritives or even become quite spoiled.

According to known methods of forced dehydration of green crop, hot air is usually used for evaporation and extraction of water contained in the green crop. Generally, the moist green crop is supplied into a stream of hot air and carried along in this stream until the water content has decreased to a desired value. However, the equipment used for carrying out this method is rather large and is unsuited for the desired mobility on the field. Consequently, green crop to be dehydrated according to this method must be collected on the field and then transported to the nearest equipment installation for dehydration. This is disadvantageous because it requires expensive transport capacity to transport a material consisting mainly of water which is subsequently to be removed (new-mown green crop generally has a moisture content of about 70—80 percent by weight).

The principal object of the present invention is to provide a new method of dehydrating green crop, which method can be performed by means of an apparatus adapted to be made unusually compact and therefore better suited than prior dehydrating equipment for moving around on the field.

The method according to the invention comprises the steps of compressing the green crop, heating the green crop during the compressing operation to a temperature of at least about the boiling point of water, and allowing moisture contained by the crop to leave.

If the squeezing pressure is released at a relatively early stage of the dehydrating process, the green crop after finished dehydration will return to its original free or porous state. On the other hand, if the green crop is compressed also during a part of the time in which steam is leaving the crop, the advantage can be achieved that the green crop, its withdrawal from the dehydrating apparatus in a sufficiently dry state, will remain in its compressed state. This, of course, greatly facilitates the transportation of the crop from the field, and it also makes it possible to obtain finished wafers, so called briquettes. In the case of dehydrated green crop which initially has had a moisture content of more than 40 percent, it can be maintained in a compressed condition by heating the green crop, during the compression, to a temperature between 100° and 170° C. The particular temperature selected in this range will depend upon (1) the kind of green crop, (2) the pressure to which the green crop is subjected during the dehydration, and (3) the time during which it is subjected to the said pressure. Due, among other things, to the risk of discoloring (scorching or burning) of the green crop, the most suitable temperature is considered to lie between 110 and 120° C.

The green crop may be heated either indirectly or directly. Indirect heating may be performed either by means of a heating medium, such as steam, or electrically. Direct heating may be performed, for example, by transporting the green crop through a field of electromagnetic waves. The last-mentioned method of heating the green crop is especially advantageous because it substantially eliminates the risk of discoloring, since dehydrated crop cannot be heated by electromagnetic waves to a temperature which is critical for the crop.

According to the invention, an apparatus for performing the above-described method comprises means for compressing the green crop, means for heating the green crop during the compressing operation to a temperature of at least about the boiling point of water at the prevailing gas pressure, and means for allowing moisture contained by the green crop to leave the pressure chamber while the crop is compressed.

In connection with indirect heating of the green crop, the walls of the aforesaid pressure chamber are arranged to be heated by a heating medium, such as steam, or electrically. In connection with direct heating of the green crop, means are arranged to provide a field of electromagnetic waves within the pressure chamber.

In order to lead away moisture emitted from the green crop, the walls of the pressure chamber are provided with openings which may be arranged to be closed during a part of the dehydration process.

An advantageous form of the pressing chamber for indirect as well as direct heating of the green crop is a channel which is substantially annular in cross section and having walls provided with openings along a part or the whole of its length.

By means of the above-described apparatus, the new method can be performed either as a continuous or as a discontinuous dehydration process. In an apparatus arranged for a continuous dehydration process, the pressing channel may be so arranged that the green crop first passes along a wall portion with openings for the removal of liquid mechanically pressed from the green crop, then passes along a second wall portion without any openings, and finally passes along a third wall portion with openings for leading away steam emitted from the green crop due to the heating of the same. Preferably, the pressing channel converges in the pressing direction along a part of the whole of its length.

One embodiment of the apparatus according to the invention, chosen as an example only, will be described in the following with reference to the accompanying drawings. In the drawings, FIG. 1 is a longitudinal sectional view, somewhat schematic, of an apparatus according to the invention for continuous dehydration of green crop; FIG. 2 is a sectional view along the line II-II in FIG. 1; and FIG. 3 is a diagram illustrating the results of a number of tests concerning dehydration of green crop in accordance with the present invention.

The apparatus shown in FIG. 1 comprises means for compressing green crop, a pressing chamber in which the green crop is to be compressed, means for heating the walls of the pressing chamber, and means for allowing moisture contained by the green crop to leave the pressing chamber.

The means for compressing the green crop comprises two plungers or pistons 1 and 2, which are arranged in a housing or cylinder 8 having an inlet passage 8a through which the green crop is supplied in the direction of arrow P (FIG. 1) to the space opposite piston 1. The two pistons cooperate to force the green crop into the pressing chamber which in this case is constituted by a channel 3 of generally annular cross section. The cannel 3 is formed between an inner cylindrical member 5a and an outer cylindrical wall 6. The means for heating the outer and inner walls of channel 3 comprise a jacket 4a surrounding the outer wall 6 of the channel to form a space 4, there being another space 5 within the inner member 5a. These spaces 4 and 5 are arranged for throughflow of a heating medium, such as steam or oil heated to a temperature of about 100° C. or more. The heating medium inlet and outlet for the jacket space 4 are shown at 9 and 9a, respectively. The inlet and outlet for the other heating space 5 are not shown but may be arranged in any suitable way.

The walls of pressing channel 3 are provided with openings 6a along a part or the whole of its length for allowing moisture contained by the green crop to leave the pressing channel. By way of example, pressing channel 3 in the pressing direction may be provided with a first wall portion 3a having openings 6a, a second wall portion 3b without openings, and finally a third wall portion 3c having openings 6a. These openings are shown, by way of example, as being formed by tubes leading from channel 3 through jacket space 4 to the outside of the latter.

In dehydrating green crop by means of the above-described apparatus, fresh or slightly dried green crop is supplied to the housing space opposite the piston 1, as by means of a conveyor or other transport means. From this space the green crop, first by means of piston 1 and thereafter by means of piston 2, is forced into the annular pressing channel 3. In the pressing channel, the green crop is gradually compressed while being heated by the outer as well as the inner walls of the pressing channel, these walls in turn being heated by a heating medium (in this case superheated aqueous steam) flowing through the spaces 4 and 5. The squeezing pressure to which the green crop will be subjected within the pressing channel 3 may be controlled in advance by the forming of the channel. Depending upon requirements, the channel may be formed more or less converging along a part or the whole of its length.

A dehydration process during which the green crop is continuously moved forward through the channel 3 may be as follows: (1) fresh green crop is supplied to the first part 3a of the pressing channel, wherein any water released by the mechanical compression of the green crop discharges through the openings 6a in the first wall portion 3a of the channel, (2) the green crop is heated so that moisture retained by the green crop is evaporated, a certain internal pressure being built up in the part 3b where the pressing channel has no openings, (3) the steam thus formed leaves through the openings in the third wall portion 3c of the pressing channel, and (4) the dehydrated crop leaves the pressing channel in the form of one or more self-sustaining rods which are cut into desired lengths. The cutting means is schematically illustrated in FIG. 1 by the arrow Q. Also schematically illustrated in FIG. 1 is the fact that jacket 4a does not necessarily extend along the whole length of pressing channel 3. It may be desirable to allow the crop, after having been heated, to be transported within an unheated section of channel 3 so as to assure that the compressed end product will maintain its form as it leaves channel 3. Further, it may be desirable to keep the final portion of the heated walls of the pressing channel 3 at a lower temperature than that prevailing in the upstream portions of the pressing channel so as to avoid scorching or burning of the crop after it has been partly dehydrated.

Test runs have shown that any noticeable self sustainment or coherency of the constituents of the dehydrated end product cannot be achieved with green crop having a moisture content as high as 40 percent or more, if it is not heated to a temperature of about 100° C. (i.e. the boiling point of water) or more, even if a very high squeezing pressure (360 kp/cm.²) and/or a long pressing time (6 min.) is used. It is not yet quite clear why an acceptable self-sustainment of the crop is obtained at temperatures at or above 100° C. It probably depends on complicated chemical and physical conditions. As the principal object of the present invention is to provide a method of rapidly and effectively dehydrating new-mown or relatively new-mown green crop, temperatures exceeding 100° C. are especially advantageous, as such a dehydration at temperatures below the boiling point of water would be too time consuming. Test runs therefore have been confined to treatment temperatures exceeding 100° C.

The diagram of FIG. 3 illustrates the results of a number of test runs in which green crop was dehydrated at different pressures and temperatures. The initial material used in connection with the test runs was green crop having a moisture content of about 70 percent by weight. The horizontal axis of the diagram shows the squeezing pressure in kp/cm.², and the vertical axis shows the moisture content in percent by weight of the crop after the dehydration process. The curves in the diagram are indicated at A through G, and the following table shows the pressing times used (in seconds) and the temperatures to which the walls of the pressing chamber were heated in connection with the test runs according to the different curves.

The temperature within the green crop was measured during the dehydration process, and in all cases the temperature at least during a part of the pressing time was about 100° C. or more.

| Curve: | Press. time (s) | Temp. (° C.) |
| --- | --- | --- |
| A | 30 | 155 |
| B | 50 | 115 |
| C | 50 | 155 |
| D | 100 | 115 |
| E | 100 | 155 |
| F | 200 | 115 |
| G | 200 | 155 |

In the diagram of FIG. 3 is also shown a horizontal dotted line H. This line, representing a moisture content of the treated crop of about 40 percent by weight, is the upper limit for acceptable moisture content of crop having been dehydrated in accordance with the present invention. Also, with respect to the self-sustainment or coherency of the substituents of the end product, this line constitutes a limit over which acceptable wafers or briquettes could not be obtained.

Of course, the above-described test runs are insufficient for stating optimal values for the different elements cooperating in connection with the dehydrating operation (as a matter of fact, these values vary between different kinds of green crop), or for stating how far the dehydration can be carried by the practice of the present invention. The dehydration can probably be carried farther than as shown by the above-described test runs.

In FIGS. 1 and 2, reference numeral 10 designates radial webs supporting the inner cylindrical member 5a within the surrounding cylindrical part 6. The webs 10 thus divide the pressing channel 3 into subchannels of arcuate cross section, as shown in FIG. 2.

I claim:

1. A method of dehydrating green crop generally having a moisture content of at least about 70 percent which comprises the steps of compressing the green crop, heating the green crop while under compression to a temperature of at least about the boiling point of water at the prevailing gas pressure, and causing moisture contained by the green crop to leave the same and thereby provide the crop with a reduced moisture content not in excess of about 40 percent.

2. The method according to claim 1, in which the green crop is held under compression during emission of steam from the crop, to obtain an end product which is self-sustained or coherent.

3. The method according to claim 1, in which said compression of the green crop is sufficient to obtain an end product adapted to be formed into briquettes without further compression.

4. The method according to claim 1, in which said heating is carried to a temperature between 100° C. and 170° C.

5. The method according to claim 1, in which said heating is carried to a temperature between 110° C. and 120 °C.

6. The method according to claim 1, in which said heating is effected indirectly.

7. The method according to claim 1, comprising also predehydrating the green crop by squeezing to a moisture content of 50 to 70 percent prior to said steps.

8. The method according to claim 1, in which the green crop is compressed into an elongated body which is substantially annular in cross section, said heating being effected from both the inside and the outside of said body.

9. The method according to claim 8, comprising also dividing said elongated body into rods during said compressing, and cutting said rods into desired lengths.